United States Patent
Doty et al.

(10) Patent No.: US 11,337,034 B1
(45) Date of Patent: May 17, 2022

(54) STAGGERED EXAMINATION OF NON-TRUSTED RECEIVER INFORMATION

(71) Applicant: Rockwell Collins, Inc., Cedar Rapids, IA (US)

(72) Inventors: James H. Doty, Cedar Rapids, IA (US); David A. Anderson, Coggon, IA (US); Patrick Y. Hwang, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 36 days.

(21) Appl. No.: 16/993,214

(22) Filed: Aug. 13, 2020

(51) Int. Cl.
| H04W 24/00 | (2009.01) |
| H04W 4/029 | (2018.01) |
| G01S 19/26 | (2010.01) |
| H04W 4/02  | (2018.01) |

(52) U.S. Cl.
CPC ............ H04W 4/029 (2018.02); G01S 19/26 (2013.01); H04W 4/027 (2013.01)

(58) Field of Classification Search
CPC ........ H04W 4/029; H04W 4/027; G01S 19/26
See application file for complete search history.

(56) References Cited

U.S. PATENT DOCUMENTS

| 6,292,750 | B1 | 9/2001 | Lin |
| 6,496,778 | B1 | 12/2002 | Lin |
| 7,724,184 | B2 | 5/2010 | Waid |
| 8,922,427 | B2 | 12/2014 | Dehnie et al. |
| 9,121,940 | B2 | 9/2015 | Psiaki et al. |
| 9,466,881 | B1 | 10/2016 | Berry et al. |
| 9,507,026 | B2 | 11/2016 | Nichols |
| 9,513,129 | B2 | 12/2016 | Wang |
| 9,927,526 | B2 | 3/2018 | Sernik |
| 10,094,930 | B2 | 10/2018 | Schipper et al. |
| 10,302,450 | B1 | 5/2019 | Doty et al. |
| 10,310,091 | B2 | 6/2019 | Trevino et al. |
| 10,379,616 | B2 | 8/2019 | Peshkin et al. |
| 10,423,228 | B2 | 9/2019 | Cherif et al. |
| 10,641,906 | B2 | 5/2020 | Altrichter |
| 2013/0267242 | A1* | 10/2013 | Curticapean .......... G01S 5/0242 455/456.1 |
| 2014/0232593 | A1* | 8/2014 | Varoglu .................. G01S 19/48 342/357.28 |
| 2016/0124548 | A1 | 5/2016 | Cherif et al. |

(Continued)

FOREIGN PATENT DOCUMENTS

| CN | 106772455 A | 5/2017 |
| CN | 107221223 A | 9/2017 |

(Continued)

*Primary Examiner* — Erika A Washington
(74) *Attorney, Agent, or Firm* — Suiter Swantz pc llo (57) ABSTRACT

A system detects slowly diverging navigational signals by updating the current location from purely internal navigational aids for a period of time. The updated location compared to a continuously corrected current location; if the comparison indicates a deviation outside an expected boundary threshold, the external source is excluded from further measurements. Multiple monitoring elements may be staggered such that one or more monitoring elements are always sequestered for future comparisons. The multiple monitoring elements may monitor different external sources with different weights to identify a specific faulty external source.

12 Claims, 8 Drawing Sheets

(56) References Cited

U.S. PATENT DOCUMENTS

| | | | |
|---|---|---|---|
| 2016/0349379 A1 | 12/2016 | Lacaze et al. | |
| 2018/0317046 A1* | 11/2018 | Brooks | H04W 64/00 |
| 2019/0138153 A1 | 5/2019 | Olley et al. | |
| 2019/0179031 A1 | 6/2019 | Broumandan et al. | |
| 2019/0302272 A1 | 10/2019 | Balog et al. | |
| 2019/0355272 A1 | 11/2019 | Nusbaum et al. | |

FOREIGN PATENT DOCUMENTS

| | | |
|---|---|---|
| CN | 108931260 A | 12/2018 |
| CN | 109581426 A | 4/2019 |
| EP | 2624238 A1 | 8/2013 |
| EP | 3454089 A1 | 3/2019 |
| EP | 3547287 A1 | 10/2019 |

\* cited by examiner

STAGGERED EXAMINATION OF NON-TRUSTED RECEIVER INFORMATION

BACKGROUND

Global Navigation Satellite Systems (GNSS) and other navigational aids that rely on external signals are vulnerable to interference, both incidental and deliberate, and technical faults in the signal source. GNSS inertial integrated systems can use "residual checking" to validate GNSS measurements before they are incorporated into the integration algorithm; measurements that suddenly jump away from the current solution can be rejected because they are outside an expected uncertainty range. However, if the faulty external signal diverges slowly over time, within bounds defined by the noise in the measurements and the accuracy of the internal sensors, the divergence will be incorporated into the determined location, driving the system further and further off course.

SUMMARY

In one aspect, embodiments of the inventive concepts disclosed herein are directed to a system and method that detects slowly diverging navigational signals. A monitoring element receives an initial location based on an external source, then updates the current location from purely internal navigational aids for a predefined period of time. The monitoring element periodically compares the updated current location to a continuously corrected location based on the external source; if the comparison indicates a deviation outside an expected boundary threshold, the external source is excluded from further measurements.

In a further aspect, multiple monitoring elements are staggered such that one or more monitoring elements are always sequestered for future comparisons. In a further aspect, the multiple monitoring elements may monitor different external sources with different weights to identify a specific faulty external source.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method that detects slowly diverging navigational signals. A monitoring element receives an initial location based on an external source, then updates the current location, defined by sets of coordinates or sets of data measurements corresponding to a location in a dataspace, based purely on trusted navigational and/or timekeeping aids for a period of time that may be predefined algorithmically or dynamically determined based on system and theater conditions and/or sets of rules based on factors such as flight phase, horizontal alert limit, etc. The monitoring element periodically compares the updated current location to a continuously corrected location based on the external source; if the comparison indicates a deviation outside an expected boundary threshold, the external source is excluded from further measurements. It may be appreciated that "location," including an initial location and current location, may include any type of solution derived from sensor data as described herein, including but limited to position, velocity, acceleration, attitude, heading, and time. Generally, the term "location" may apply to a physical location in the discipline of navigation or a virtual location or coordinate in a data space. For example, for a precision timing solution, time is a location in a timing dataspace. Embodiments may be more fully understood with reference to U.S. Pat. No. 10,302,450, which is incorporated by reference.

Figure 1:
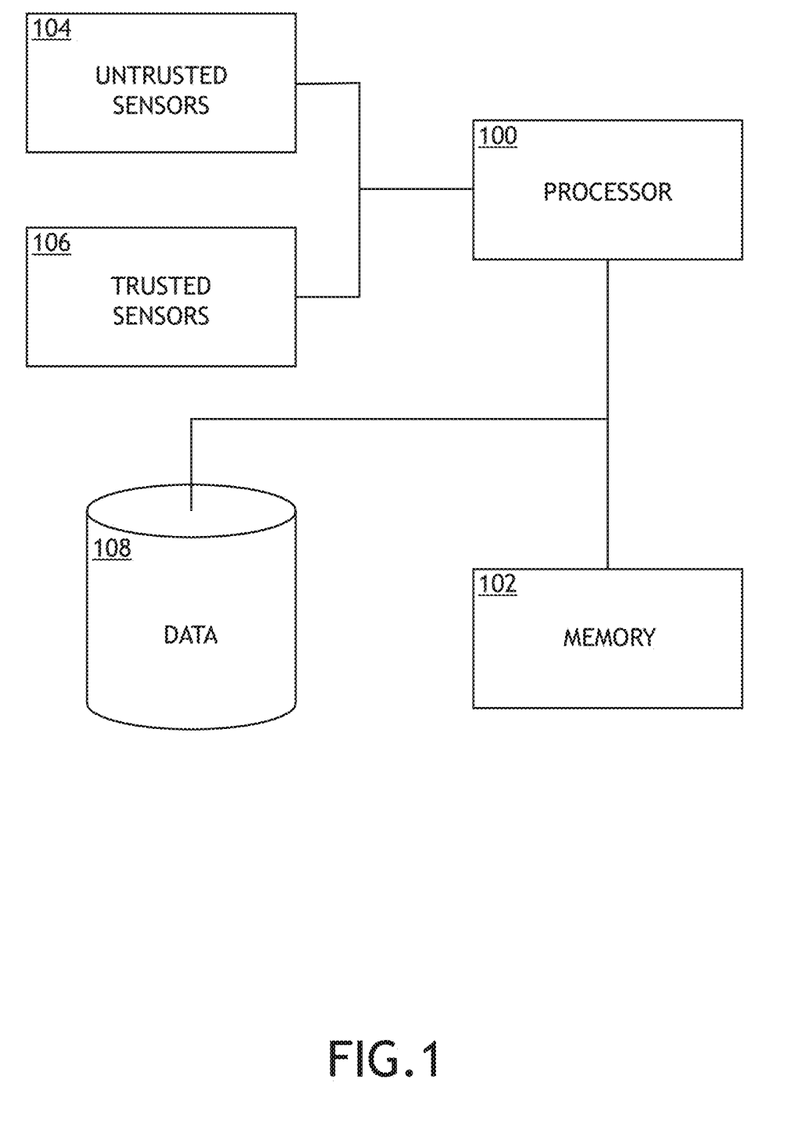
FIG. 1 shows a block diagram of a system suitable for implementing an exemplary embodiment.

Referring to FIG. 1, a block diagram of a system suitable for implementing an exemplary embodiment is shown. The system includes a processor 100, memory 102 connected to the processor 100 for embodying processor executable code, one or more untrusted sensors 104, and one or more trusted sensors 106.

Untrusted sensors 104 may have faults that are common to all systems, making detection and elimination by downstream voting ineffective. Untrusted sensors 104 include devices such as GPS receives or other GNSS receives that utilize external signals, or vision sensors. GNSS signals may contain signal-in-space errors that can cause common faults on all GNSS receivers on a vehicle. Vision sensors may encounter optical illusions that are seen by all cameras and vision processing systems, especially for objects too distant to produce different perspectives from vehicle mounted cameras via parallax. Generally, untrusted sensors 104 may include any sensors that may exhibit faults that cannot be detected by other means in a particular application; therefore, the specific classification of sensors as "trusted" or "untrusted" may be application dependent.

Trusted sensors 106 are those sensors that are independent of outside influences that could cause substantially similar errors in multiple systems on the vehicle. Trusted sensors 106 included devices such as barometric sensors, inertial sensors including inertial measurement units, (IMU), a system clock, wheel sensors, or any other sensors that purely internal to the vehicle and do not rely on external signals. The definition of a trusted sensor 106 may change based on the application. In some cases, the delineation between untrusted sensors 104 and trusted sensors 106 may be based on whether they are subject to common mode faults, whether they are subject to particular erroneous signals, or whether the certification pedigree of the systems have exceeded some maturity threshold.

In at least one embodiment, the processor 100 is in data communication with a data storage device 108 to store location data over time as determined by processes operating in parallel. For example, in at least one embodiment, a process executing on the processor 100 may continuously receive location data or measurements from one or more untrusted sensors 104, validate that data with reference to the trusted sensors 106, and store the validated measurements in the data storage element 108. Meanwhile, one or more separate processes may periodically receive location data from one or more untrusted sensors 104, then update the location data with reference solely to the trusted sensors 106 for the duration of the period, and store the updated measurements in the data storage element 108. The updated measurements are compared to the validated measurements periodically to identify drift in the untrusted sensors 104 that is not identifiable by continuous validation.

Figure 2:
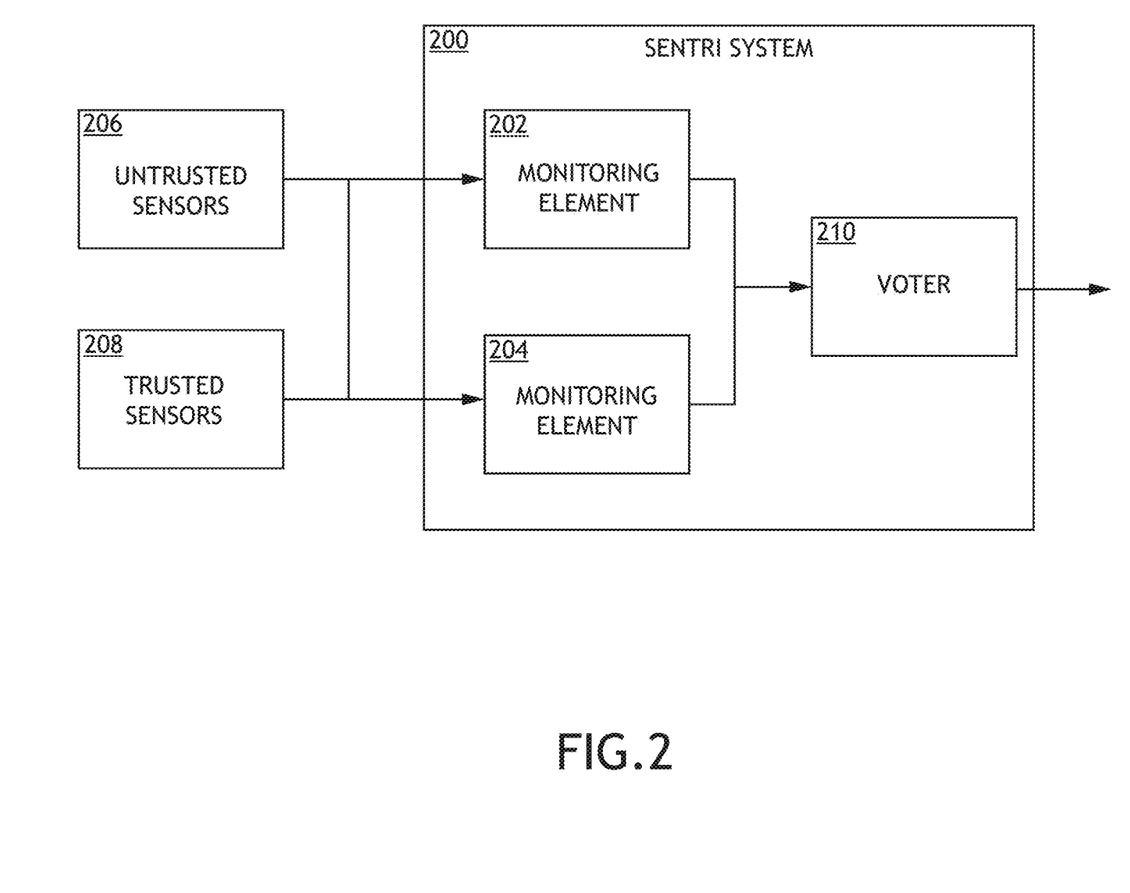
FIG. 2 shows a block diagram of a system for monitoring untrusted navigation and/or timekeeping signals according to an exemplary embodiment.

Referring to FIG. 2, a block diagram of a system for monitoring untrusted navigation and/or timekeeping signals according to an exemplary embodiment is shown. The system includes a validation system 200 of one or more separate monitoring elements 202, 204 that receive data from untrusted sensors 206 and trusted sensors 208. In at least one embodiment, the validation system 200 includes a voter 210 that receives output from each of the monitoring elements 202, 204. At least one of the monitoring elements 202, 204 applies data from the untrusted sensors 206 in a way that leads to a different authority in the way the untrusted sensor data impacts the corresponding monitoring element output.

Applying data from untrusted sensors 206 differently may include, but is not limited to, some combination of:
  applying the data intermittently (using some data samples and not others, i.e., coasting);
  applying corrections with different gains such that the same data corrects different monitoring elements 202, 204 differently as compared to each other;
  screening the data with different rejection thresholds; and
  averaging the difference of the data and the current measurement over time; for example, allow data indicating smaller offsets to be rejected before the data or the average is incorporated.

The voter 210 combines the output from the monitoring elements 202, 204 to form an output that is more robust to errors in the untrusted sensors 206. Combining data via the voter 210 may include, but is not limited to:
  voting to select the best output based on a comparison of outputs or a weighted average of the outputs;
  a weighted average of outputs after one or more outputs are rejected by a voting comparison;
  a weighted average of all outputs;
  flagging some outputs as not ensured to meet certain performance or integrity limits; and
  an integrity or performance bound estimate.

In at least one embodiment, a weighted average includes any weighting, even equal weighting of all outputs. The voter 210 may be configured to optimize fault-free performance, robustness to errors in the untrusted sensors 206, or any combination of requirements.

The monitoring element 202, 204 and voter 210 outputs may contain some value based on the inputs (such as position or time) and/or an integrity and/or performance bound or characteristic. For example, the monitoring elements 202, 204 may each output a fault-free performance bound and the voter 210 may use these fault-free performance bounds to calculate a performance and/or integrity bound.

In at least one embodiment, the validation system 200 may validate and bound the output of a fully-aided location measurement process. In such embodiments, only the integrity or performance bound of the monitory element 202, 204 output is combined to form a performance and or integrity bound. For example, the validation system 200 may be used to monitor another integrated system and flag when that system is not meeting a performance or integrity requirement.

If may be appreciated that while specific embodiments described herein include a continuous, fully-aided location measurement process, embodiments are envisioned that do not utilize such fully-aided processes.

Figure 3:
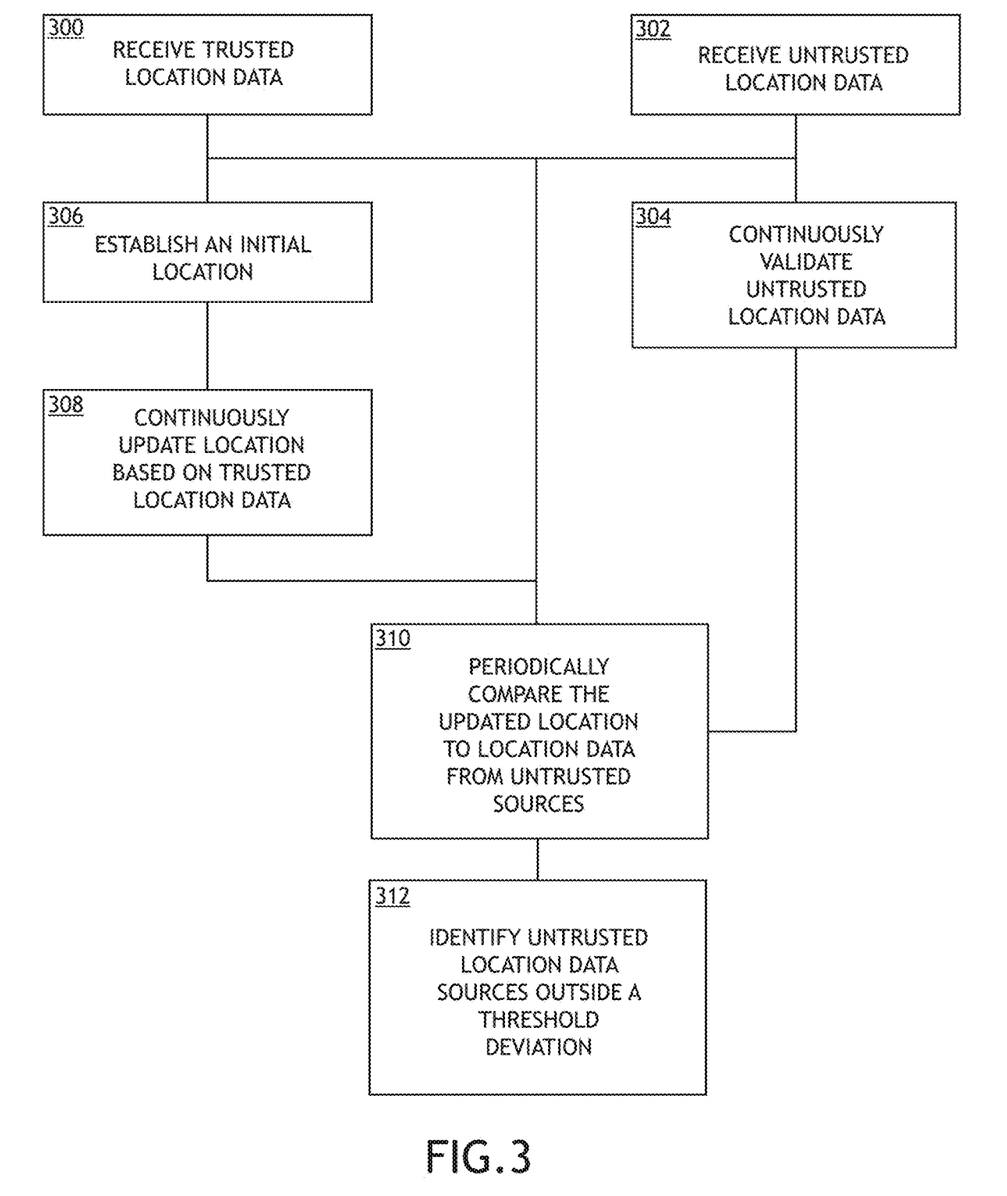
FIG. 3 shows a flowchart of a method for monitoring untrusted navigation and/or timekeeping signals according to an exemplary embodiment.

Referring to FIG. 3, a flowchart of a method for monitoring untrusted navigation and/or timekeeping signals according to an exemplary embodiment is shown. A navigational system receives 300 trusted sensor data from sensors that do not rely on input data subject to external interference or faults, and receives 302 untrusted sensor data which may be more accurate over long distances but is potentially subject to faults and drift originating from external sources. For example, a faulty satellite signal may cause GNSS location measurements to slowly but cumulatively drift over time.

A monitoring element establishes 306 an initial location based on the untrusted location data. The monitoring element is then sequestered for a specific period of time wherein the location is continuously updated using only trusted sensor data. For example, the initial location may be determined with reference to a GNSS system, then continuously updated with reference to one or more IMUs.

When the specific period of time expires, the updated location is compared 310 to a current location derived from the untrusted location data. If the current location is determined 312 to be outside some threshold bounds defined by the accuracy of the trusted sensor data, the untrusted sensor data (and corresponding sensors or systems) may be flagged as faulty or unreliable. For example, after a specific period of time In at least one embodiment, a separate process continuously validates 304 untrusted sensor data against trusted sensor data. The validated location then comprises the current location data for comparison purposes.

Figure 4A:
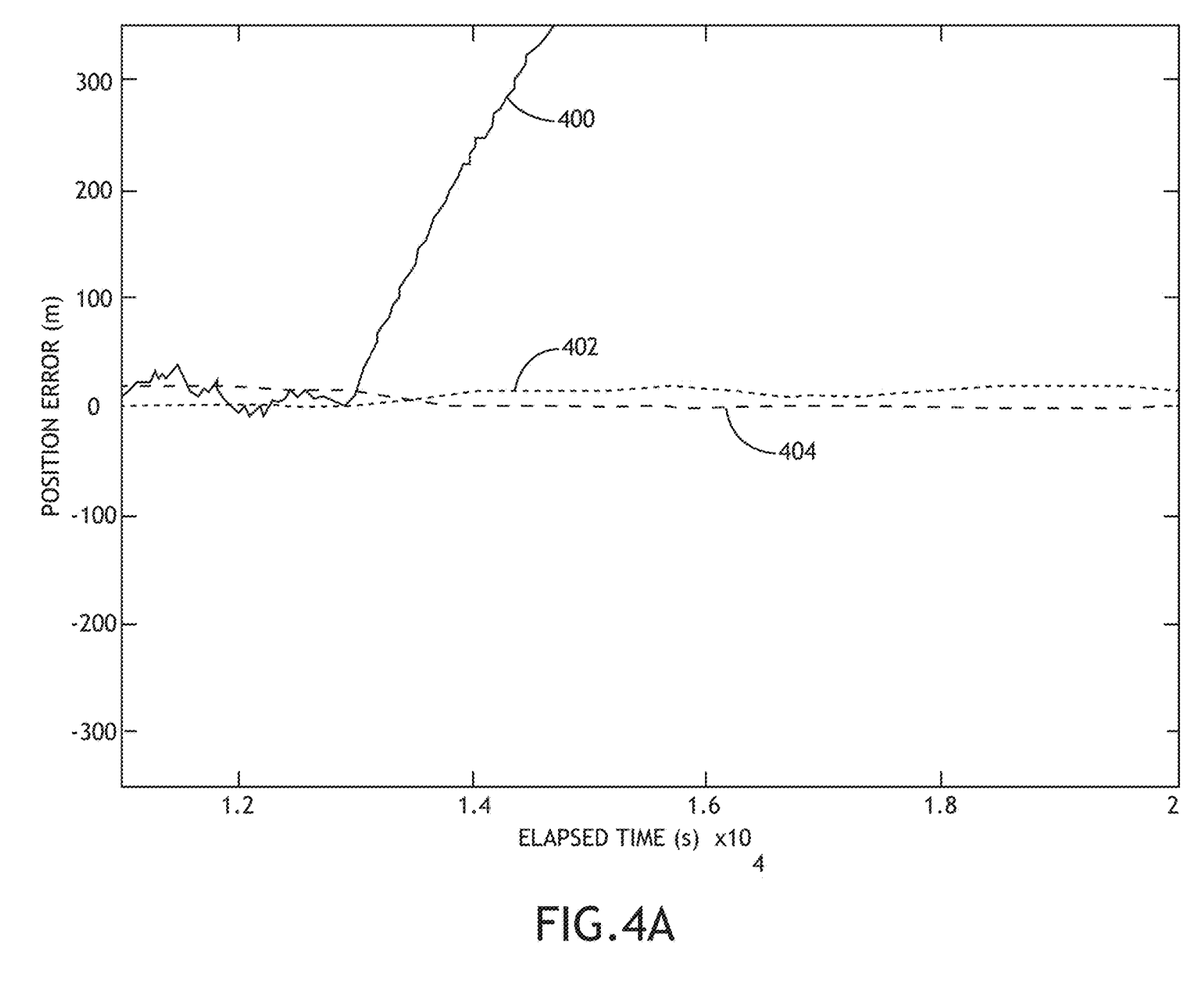
FIG. 4A shows a chart of position error over time with respect to deviation boundaries.
Figure 4B:
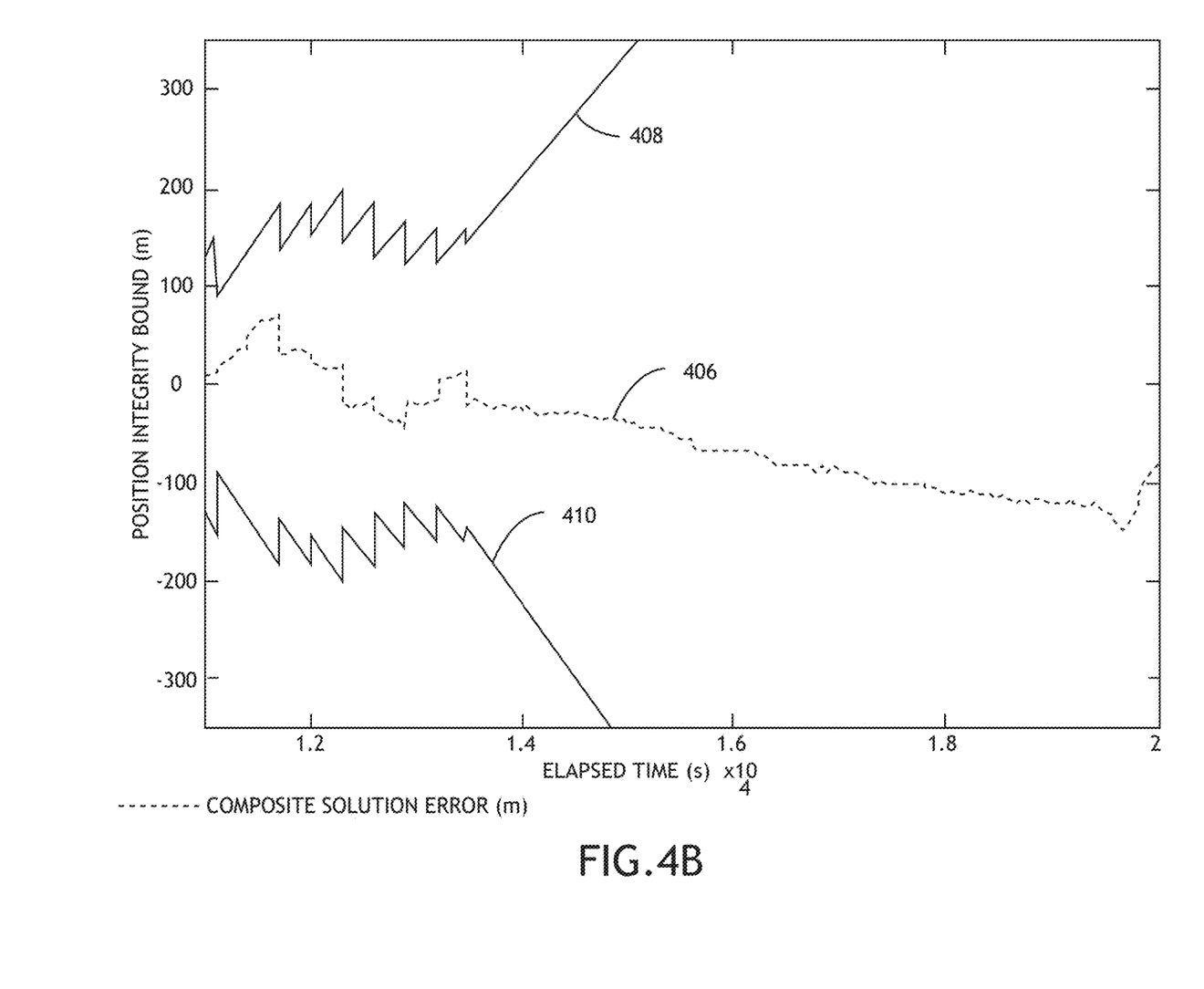
FIG. 4B shows a chart of position error over time with respect to deviation boundaries.

Referring to FIG. 4A-4B, charts of position error over time with respect to deviation boundaries are shown. A location measurement system utilizing continuous validation to validate untrusted sensor data against trusted sensor data may produce a location measurement that is closely bounded 402, 404. That is to say the measurement is considered valid because at no time does the measurement stray outside a threshold deviation defined by the accuracy of the trusted sensors. However, a slow drift 400 over time may cause the measurement to deviate substantially from reality. Such deviation may be dangerous where the measurement is relied upon.

A location measurement system utilizing embodiments of the present disclosure detects GNSS errors and provides a location measurement that is less impacted by the erroneous GNSS measurements or position solution. The location measurement system can provide a protection bound 408, 410 to slow drift error 406 in addition to, or instead of, fault-free or single satellite fault bounds depending on the needs of the application. Protection bounds consider multi-satellite or interference errors in GNSS measurements. Even when the GNSS receiver is operating in the presence of interfering data or a GNSS constellation fails causing all the satellites to have coordinated faults, the location measurement system can bound the location measurement.

Figure 5:
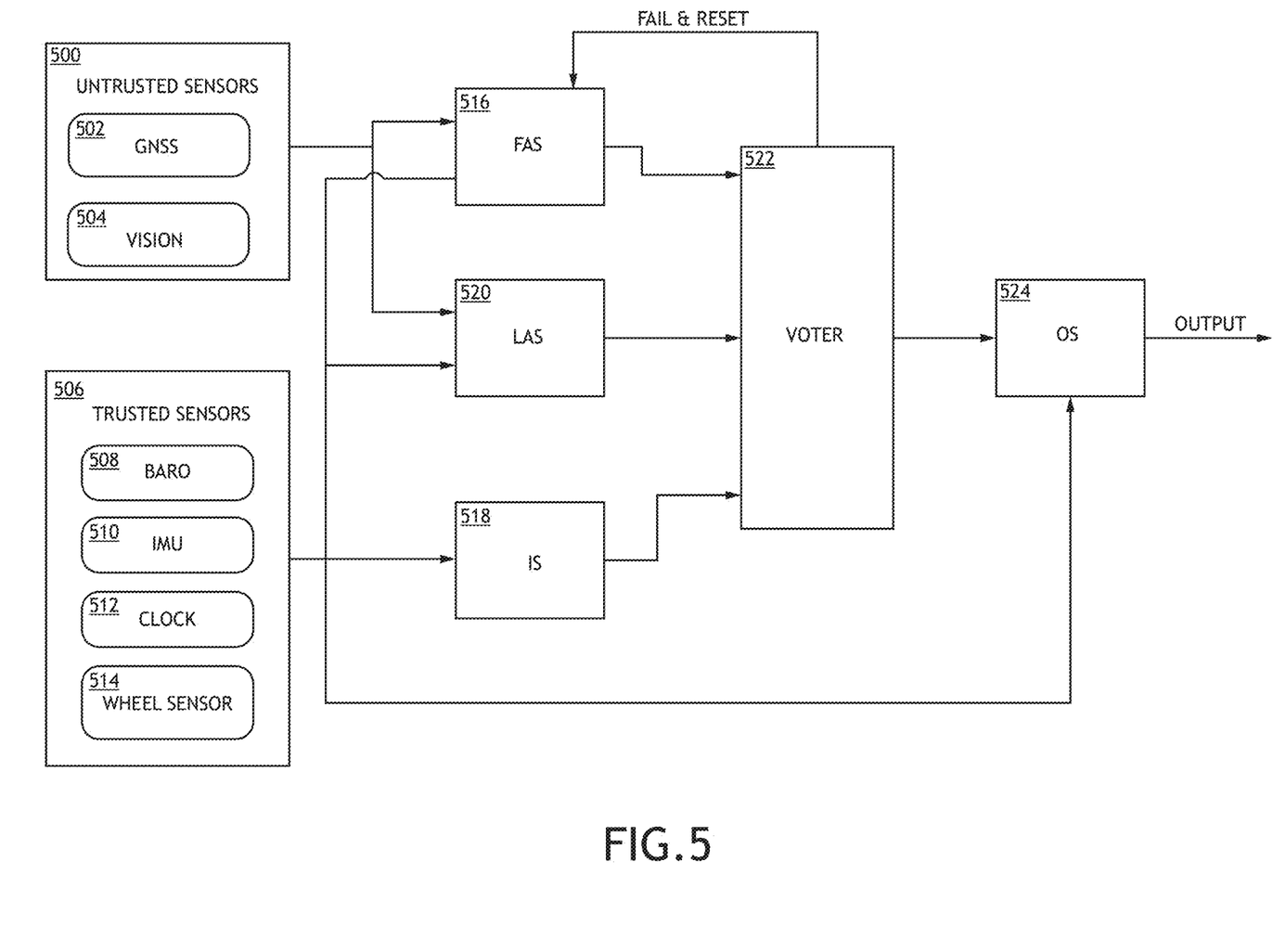
FIG. 5 shows a block diagram of a system for monitoring untrusted navigation and/or timekeeping signals according to an exemplary embodiment.

Referring to FIG. 5, a block diagram of a system for monitoring untrusted navigation and/or timekeeping signals according to an exemplary embodiment is shown. In a navigation or location system including both untrusted sensors 500 and trusted sensors 506, monitoring and validation elements 516, 518, 520 monitor and validate the untrusted sensors 500 according to various algorithms. Untrusted sensors 500 may include devices such as GNSS receivers 502, vision-based sensors 504, or other systems that utilize exterior signals or references. Trusted sensors 506 may include barometers 508, IMUs 510, system clocks 512, wheel sensors 514, or other systems that are not subject to external interference or fault.

In at least one embodiment, the system main include a fully-aided process 516. The fully-aided process 516 is a sensor integration system that utilizes untrusted sensors 500 that includes measurement screening with reference to trusted sensors 506 to prevent incorporation of erroneous untrusted sensor data that is inconstant with the current location measurement. Measurement screening detects and excludes erroneous untrusted sensor data that has rapidly deviated but cannot exclude slowly deviating measurements.

In at least one embodiment, the system includes an independent process 518 that only utilizes trusted sensors 506 and therefore is not impacted by any fault or erroneous data from the untrusted sensors 500. For example, an inertial reference system may provide a location measurement purely from IMUs 510 that drifts at two nautical miles per hour. For a timing system, the independent process 518 may comprise an uncorrected clock that is initialized at a known time. The independent process 518 may have input limiting or screening especially if it incorporates sensors, such as a wheel sensor 514, that may have output glitches or brief periods of wheel slip. Independent processes 518 are less accurate and provides less data than the fully-aided processes 516.

The system includes a limited-aided process 520 to detect errors that are too small to detect with an independent process 518 or errors in parameters that are not output by the independent process 518. The limited-aided process 520 updates location measurements solely from trusted sensors 506, and periodically compares the updated location measurement to a current location measurement derived from the untrusted sensors 500 to validate that current location. The limited-aided process 520 reduces or delays the effects of errors in the untrusted sensors 500 until have accumulated to the point where they are detectable. In one exemplary embodiment, the authority of the untrusted sensors 500 is reduced to correct a location measurement from the limited-aided process 520, and/or incorporation of the measurements is delayed. Enhanced measurement screening may be used to detect smaller errors than those detectable by fully-aided process 516. In one exemplary embodiment, the difference between the untrusted measurements and the limited-aided process 520 location estimate are averaged for a predefined period of time (such as 30 seconds) to average out white noise in the individual measurements of the untrusted sensors 500. Measurement screening may detect a smaller offset in the untrusted sensors 500 that may be obscured by noise in the fully-aided process 516 measurement screening.

In at least one embodiment, the system includes a voter 522 to discriminate between location measurements from one or more separately operating processes 516, 518, 520. In one exemplary embodiment, there may be a hierarchy such that the independent process 518 is more trusted than the limited-aided process 520, and the limited-aided process 520 is more trusted than the fully-aided process 516. In other embodiments, a weighted average of two or more of the processes 516, 518, 520 may be preferable. For example, the fully-aided process 516 and limited-aided process 520 location measurements may be combined into a weighted average; the voter 522 may revert to the limited-aided process 520 alone if the fully-aided process 516 diverges from this weighted solution or the fully-aided process 516 and limited-aided process 520 solutions diverge. When using a weighted sum of the solutions, the integrity bound of the voter 522 solution is a function of the weighting and fault-free error characteristics of the solutions from the separately operating processes 516, 518, 520, and the voting limits. If the voter 522 determines that the fully-aided process 516 is faulty, the voter 522 may fail and reset the fully-aided process 516, and reincorporate the fully-aided process 516 location measurement in voting when it more closely agrees with the limited-aided process 520 location measurement.

In at least one embodiment, the system includes an output smoothing element 524 to smooth sudden transitions due to voter 522 switching. For example, a measurement being slightly off in attitude for a brief period of time may be preferable to having a sudden transient. Alternatively, in certain timing applications, it may be undesirable for a time offset to persist any longer than necessary. In an inertial system, the output smoothing element 524 may be driven by the trusted sensors 506 via the independent process 518, servoed to the voter 522. In a timing system, the output smoothing element 524 may be a clock running off of a trusted clock, with the offset gradually servoed to the voter output time.

Figure 6:
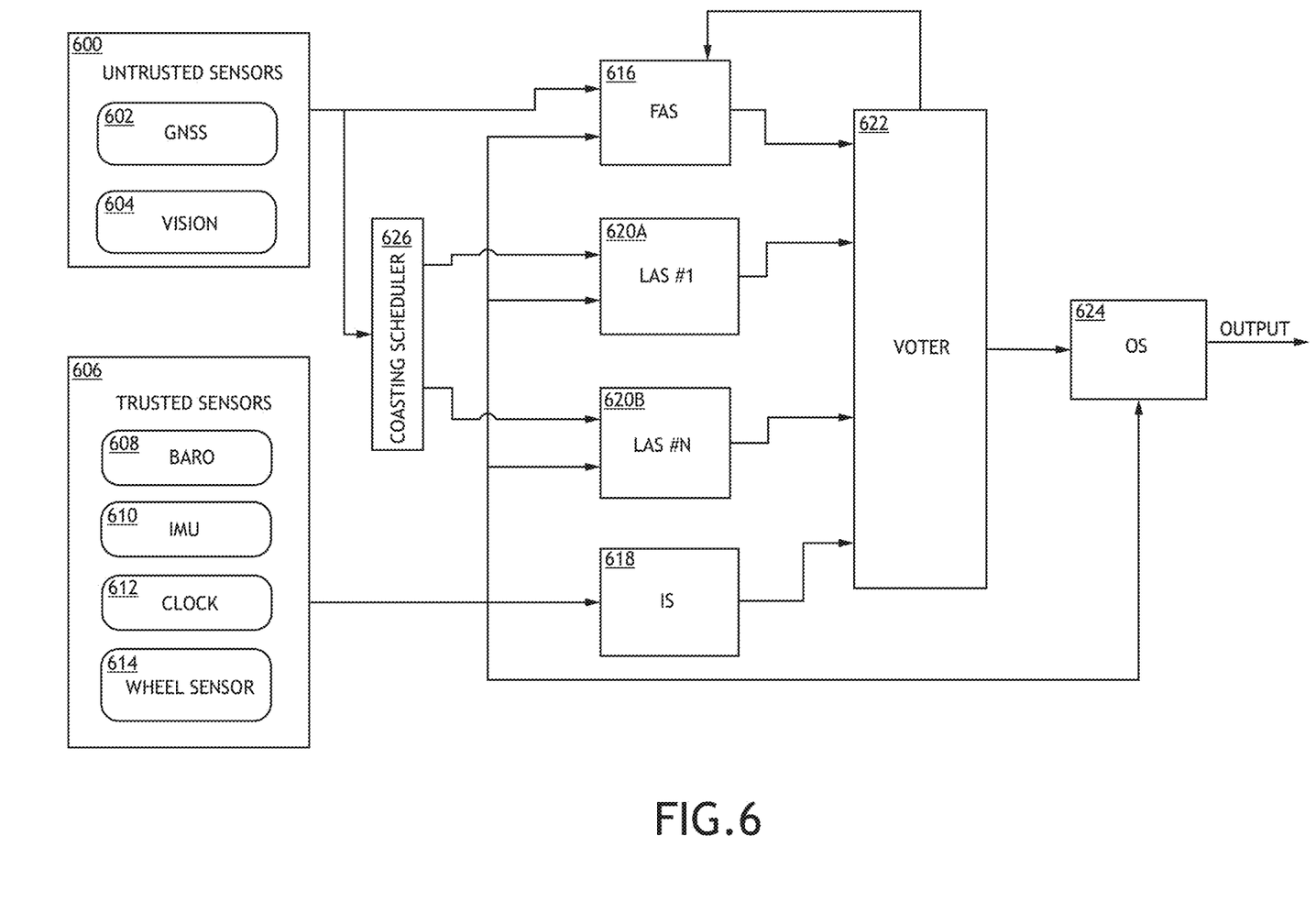
FIG. 6 shows a block diagram of a system for monitoring untrusted navigation and/or timekeeping signals according to an exemplary embodiment.

Referring to FIG. 6, a block diagram of a system for monitoring untrusted navigation and/or timekeeping signals according to an exemplary embodiment is shown. In a navigation or location system including both untrusted sensors 600 (such as GNSS receivers 602 and vision sensors 604) and trusted sensors 606 (such as barometers 608, IMUs 610, system clocks 612, wheel sensors 614), monitoring and validation elements 616, 618, 620 monitor and validate the untrusted sensors 600 according to various algorithms.

In at least one embodiment, the system main include a fully-aided process 616 to continuously validate current locations measurements from the untrusted sensors 600 against the trusted sensors 606. In at least one embodiment, the system includes an independent process 618 that only utilizes trusted sensors 606 and therefore is not impacted by any fault or erroneous data from the untrusted sensors 600.

The system includes a plurality of limited-aided processes 620*a*, 620*b* that each operate independently to detect errors that are too small to detect with an independent process 618 or errors in parameters that are not output by the independent process 618. Each of the limited-aided processes 620*a*, 620*b* may operate with a unique coasting period (different or separate periods of time between comparison to the untrusted sensors 600). Such unique coasting periods may be orchestrated and staggered by a coasting scheduler 626. Staggering ensures that at least one limited-aided process 620*a*, 620*b* is coasting (operating solely on trusted sensor 606 data) at all times.

With a plurality limited-aided processes 620*a*, 620*b*, each limited-aided processes 620*a*, 620*b* may have a different level of fault-free error due to different coasting times. The greater fault free accuracy of a short-coasting-time limited-aided process 620*a*, 620*b* may help to detect smaller but more rapidly diverging untrusted sensors 600, while the longer coasting limited-aided processes 620*a*, 620*b* may be better at detecting slow divergence. In case of a divergence in the location measurements, the voter 622 may select the shortest coasting time limited-aided processes 620*a*, 620*b* to detect the fault, or the voter 622 may output a weighted average of location measurements, excluding location measurements from the average when they diverge from the weighted sum.

In at least one embodiment, the system includes an output smoothing element 624 to smooth sudden transitions due to voter 622 switching, depending on the necessities of the receiving system.

Figure 7:
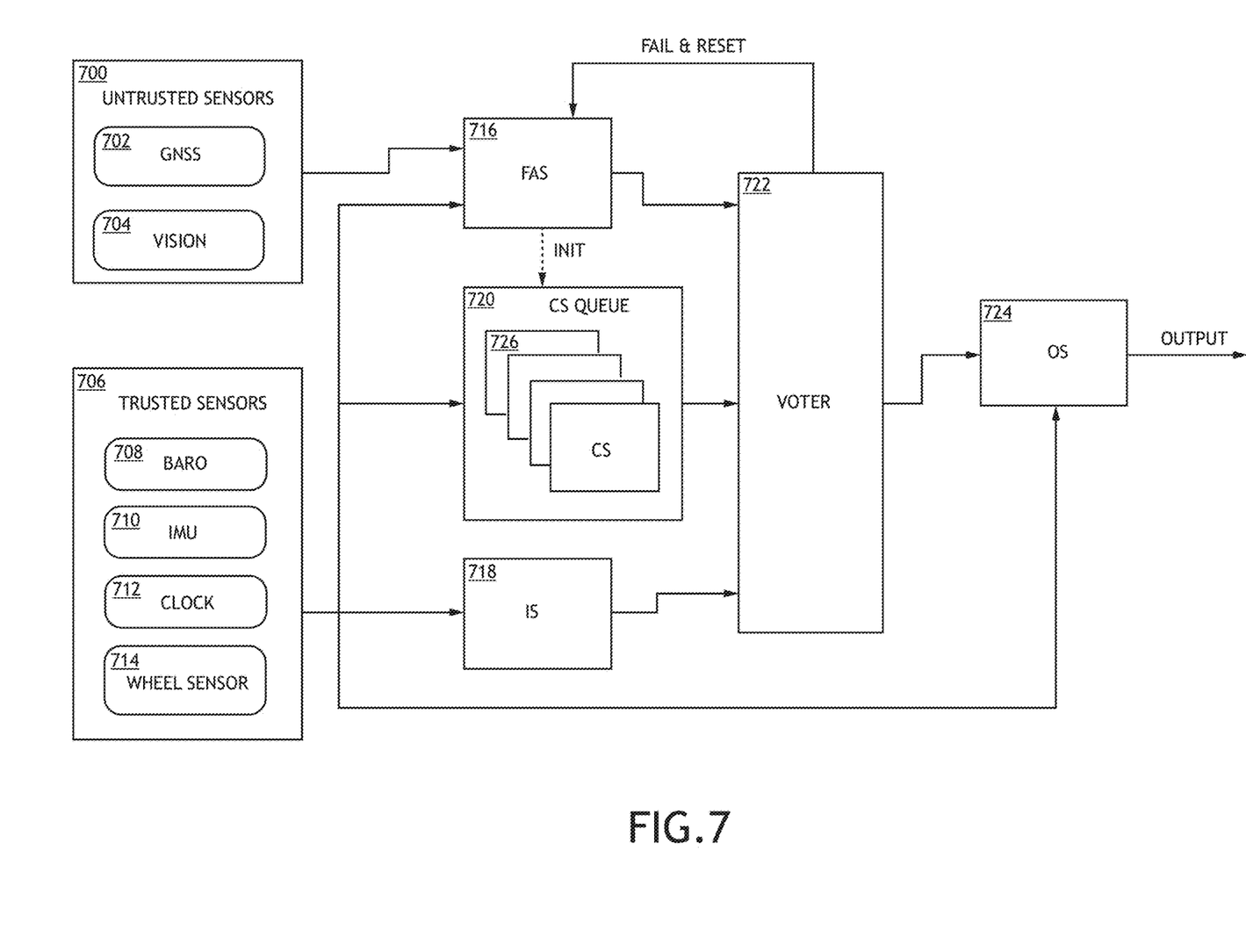
FIG. 7 shows a block diagram of a system for monitoring untrusted navigation and/or timekeeping signals according to an exemplary embodiment.

Referring to FIG. 7, a block diagram of a system for monitoring untrusted navigation and/or timekeeping signals according to an exemplary embodiment is shown. In a navigation or location system including both untrusted sensors 700 (such as GNSS receivers 702 and vision sensors 704) and trusted sensors 706 (such as barometers 708, IMUs 710, system clocks 712, wheel sensors 714), monitoring and validation elements 716, 718, 720 monitor and validate the untrusted sensors 700 according to various algorithms.

In at least one embodiment, the system main include a fully-aided process 716 to continuously validate current locations measurements from the untrusted sensors 700 against the trusted sensors 706. In at least one embodiment, the system includes an independent process 718 that only utilizes trusted sensors 706 and therefore is not impacted by any fault or erroneous data from the untrusted sensors 700.

The system includes a coasting process queue 720 that embodies a plurality of coasting processes 726. Each coasting process 726 operates without untrusted sensor 700. In the fault-free case, a fully aided process 716 offers better performance than a solution that is coasted part time. In at least one embodiment, the coasting processes 726 are initialized in a staggered fashion and queued with the current relevant states of the fully-aided process 716; the coasting processes 726 then coast solely on trusted sensor 706 data. Each coasting process 726 is operated long enough for the voter to detect an emerging fault in fully-aided process 716. Each coasting process 726 is initialized in order and maintained by the coasting process queue 720. As long as fully-aided process 716 is not been failed by the voter 722, each coasting process 726 in the coasting process queue 720 is periodically updated, on a staggered schedule with respect to the other coasting processes 726, with the fully-aided process 716 parameters. For example, a different coasting process 726 in the coasting process queue 720 is initialized every predefined number of seconds. There will always be one coasting process 726 with a coasting time defined by the number of coasting processes 726 and the predefined number of seconds.

In at least one embodiment, the system includes an output smoothing element 724 to smooth sudden transitions due to voter 722 switching, depending on the necessities of the receiving system.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A method comprising:
receiving one or more trusted signals from trusted signal sources;
receiving one or more untrusted signals from untrusted signal sources;
establishing an initial location based on the one or more untrusted signals;
establishing a plurality of monitors, each configured to establish a separate sequestered location by continuously updating the location based solely on the trusted signals for a period of time;
compare one or more of the separate sequestered locations to a current location defined by the untrusted signals after the period of time;
determine if the current location deviates from the separate sequestered locations by more than a boundary threshold; and
validate the separate sequestered locations against the current location if the current location deviates by less than the boundary threshold.

2. The method of claim 1, further comprising continuously updating the current location with reference to the trusted signals and untrusted signals.

3. The method of claim 1, wherein each of the plurality of monitors defines a different period of time.

4. The method of claim 1, wherein each of the plurality of monitors are staggered in time such that comparisons are made more frequently than once per period of time.

5. The method of claim 1, wherein each of the plurality of monitors applies a different weighting to untrusted signals.

6. The method of claim 1, further comprising continuously validating the untrusted signals via comparison to the trusted signals to establish the current location.

7. A position tracking system comprising:
one or more untrusted navigation elements configured to establish a location measurement based on one or more untrusted untrusted signals;
one or more trusted navigation elements configured to update a location measurement based on one or more trusted trusted signals; and
at least one processor in data communication with a memory storing processor executable code for configuring the at least one processor to:
establish an initial location based on the one or more untrusted navigation elements;
establish a plurality of monitors, each configured to establish a separate sequestered location by continuously updating the location based solely on the trusted navigation elements for a period of time;
compare one or more of the separate sequestered locations to a current location defined by the untrusted navigation elements after the period of time;
determine if the current location deviates from the separate sequestered locations by more than a boundary threshold; and
validate the separate sequestered locations against the current location if the current location deviates by less than the boundary threshold.

8. The position tracking system of claim 7, wherein the at least one processor is further configured to continuously update the current location with reference to the trusted navigation elements and untrusted navigation elements.

9. The position tracking system of claim 7, wherein each of the plurality of monitors defines a different period of time.

10. The position tracking system of claim 7, wherein each of the plurality of monitors are staggered in time such that comparisons are made more frequently than once per period.

11. The position tracking system of claim 7, wherein each of the plurality of monitors applies a different weighting to untrusted navigation elements.

12. The position tracking system of claim 7, wherein the at least one processor is further configured to continuously validate the untrusted navigation elements via comparison to the trusted navigation elements to establish the current location.

* * * * *